(12) United States Patent
Waldo

(10) Patent No.: US 7,980,318 B1
(45) Date of Patent: Jul. 19, 2011

(54) PENETRATOR BAR FOR VERTICAL TILLAGE EQUIPMENT

(76) Inventor: Mark E. Waldo, Eaton, IN (US)

( * ) Notice: Subject to any disclaimer, the term of this patent is extended or adjusted under 35 U.S.C. 154(b) by 330 days.

(21) Appl. No.: 11/890,739

(22) Filed: Aug. 7, 2007

(51) Int. Cl.
*A01B 21/02* (2006.01)
(52) U.S. Cl. .......................... 172/707; 172/140; 172/174
(58) Field of Classification Search .................. 172/133, 172/138–140, 143, 144, 148, 153, 155–157, 172/160, 165, 174, 198, 482, 685, 705, 707, 172/708, 763, 537
See application file for complete search history.

(56) References Cited

U.S. PATENT DOCUMENTS

| | | | | |
|---|---|---|---|---|
| 1,220,449 | A * | 3/1917 | Patterson | 172/482 |
| 2,134,438 | A * | 10/1938 | Click | 172/477 |
| 2,218,948 | A * | 10/1940 | Cooper | 172/833 |
| 2,884,081 | A * | 4/1959 | Weber | 172/482 |
| 3,225,839 | A * | 12/1965 | Petitt | 172/398 |
| 3,252,522 | A * | 5/1966 | Taylor | 172/414 |
| 3,797,580 | A * | 3/1974 | Roth | 172/311 |
| 4,406,329 | A * | 9/1983 | Schlueter | 172/310 |
| 4,577,568 | A * | 3/1986 | Netsch | 111/123 |
| 5,261,218 | A * | 11/1993 | Jones et al. | 56/366 |
| 5,437,333 | A * | 8/1995 | McPherson et al. | 171/19 |
| 5,529,128 | A | 6/1996 | Peterson et al. | |
| 5,535,832 | A * | 7/1996 | Benoit | 172/195 |
| 5,566,767 | A * | 10/1996 | Dubreuil et al. | 172/708 |
| 6,138,771 | A * | 10/2000 | Skjaeveland | 172/708 |
| 6,602,020 | B1 * | 8/2003 | Hansen | 403/395 |
| 6,695,069 | B2 | 2/2004 | Rozendaal | |

OTHER PUBLICATIONS

U.S. Appl. No. 10/521,804, filed Mar. 9, 2006, Rozendaal et al.

* cited by examiner

*Primary Examiner* — Thomas Will
*Assistant Examiner* — Matthew D Troutman
(74) *Attorney, Agent, or Firm* — J. David Haynes

(57) ABSTRACT

A method and apparatus for pre-fracturing soil before the soil is cut by coulter wheels to achieve an improved cultivation apparatus wherein a penetrator bar is rotatably mounted on the front of a tillage implement and supports a plurality of adjustable S-tines for penetration of the soil prior to cultivation and resulting interaction of the fractured soil with the coulter blades.

8 Claims, 8 Drawing Sheets

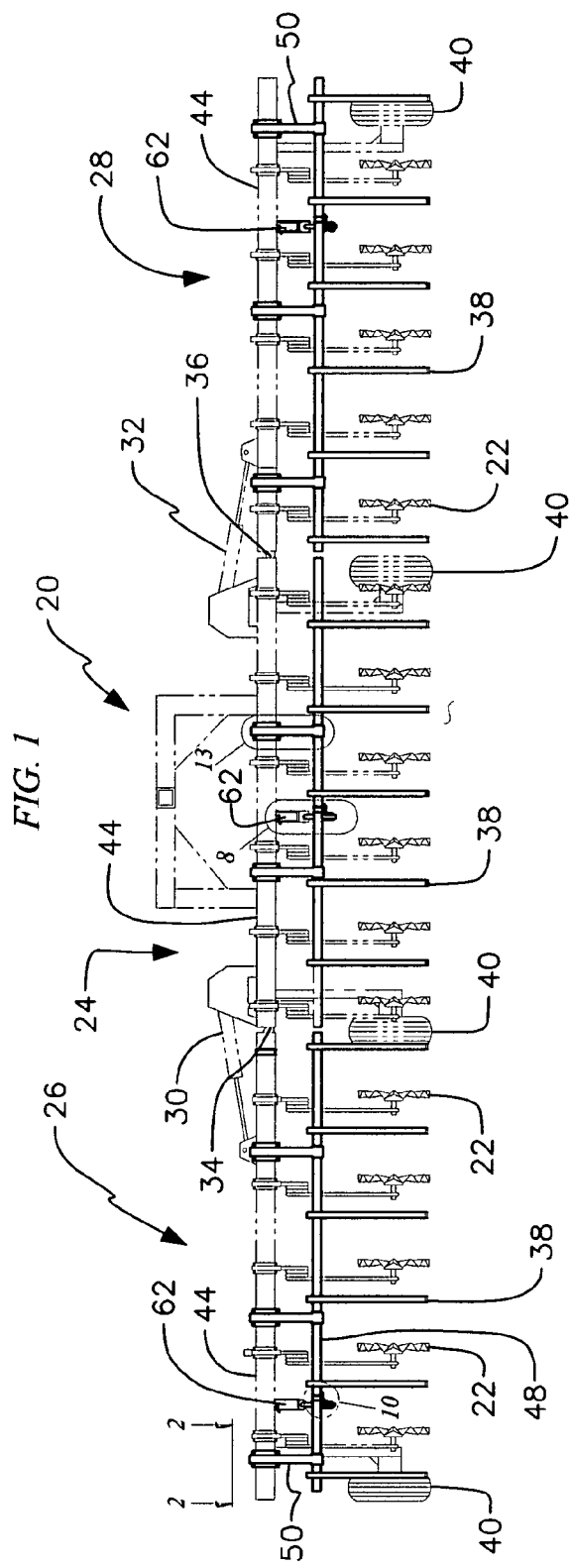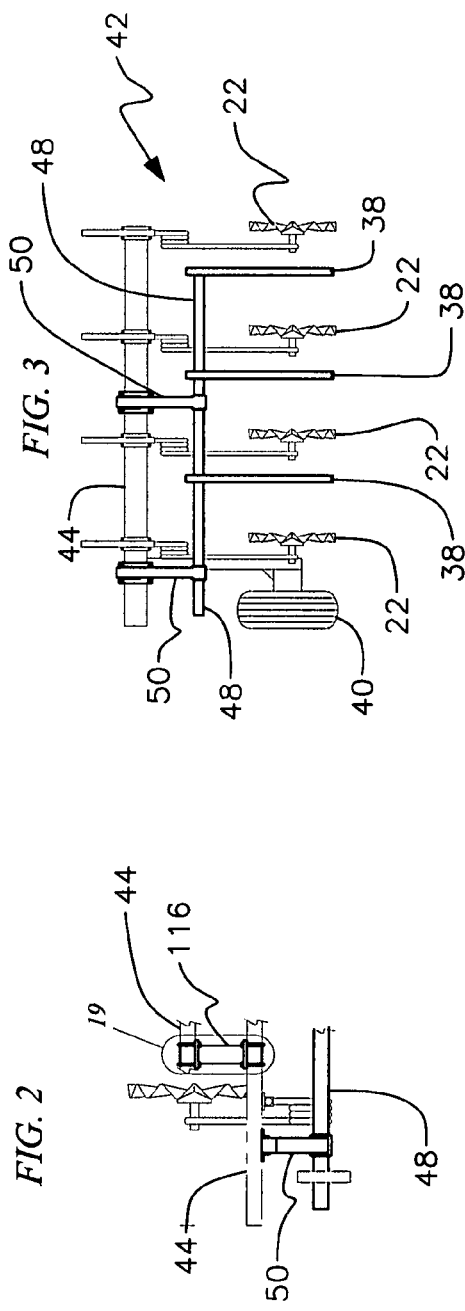

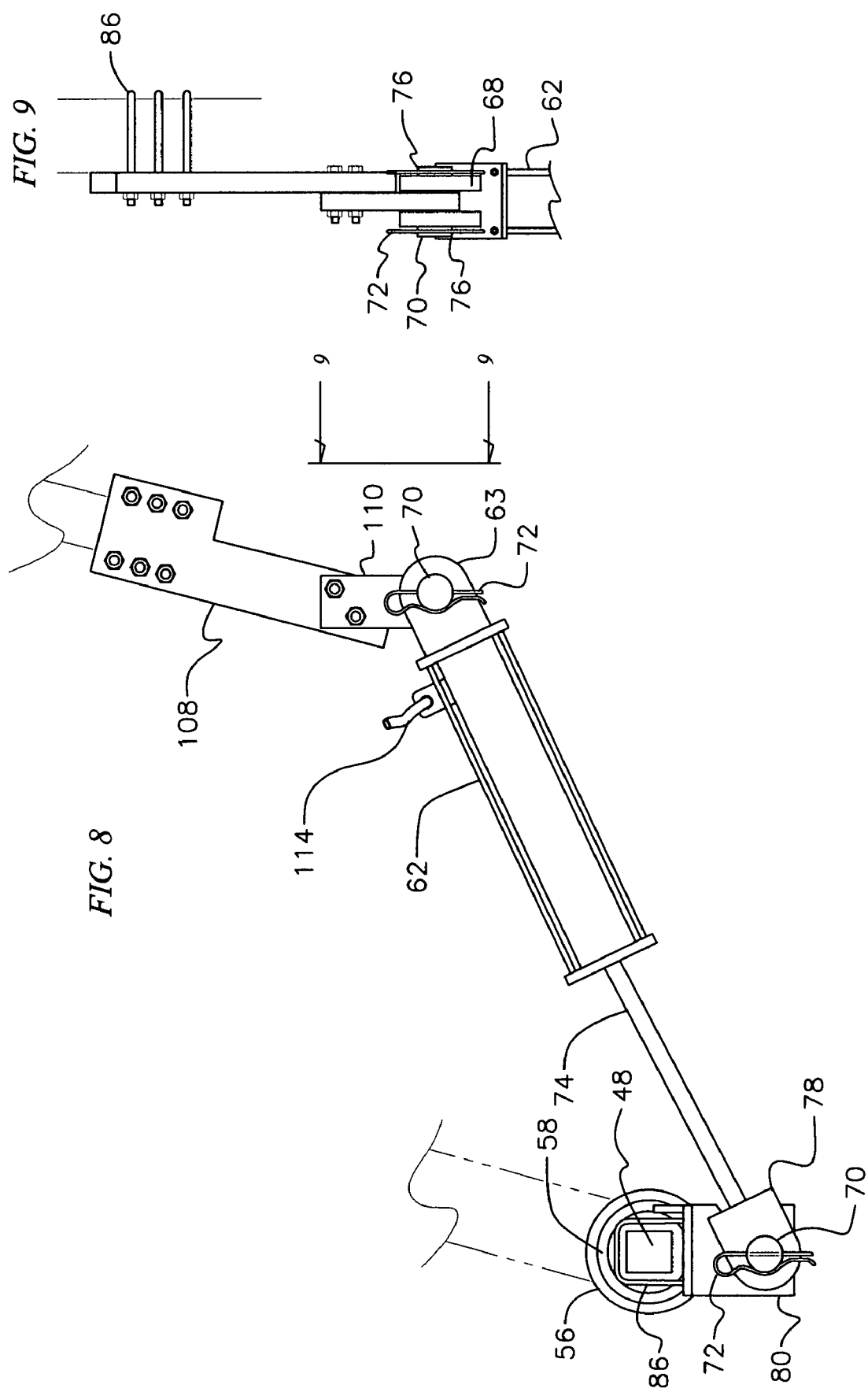

PENETRATOR BAR FOR VERTICAL TILLAGE EQUIPMENT

BACKGROUND OF THE INVENTION

1. Field of the Invention

The present invention relates to an improved apparatus for prefracturing the soil in a system and method for vertical-till and conservation-till equipment. More particularly, the present invention relates to an apparatus for improved penetration of the soil by causing the prefractured soil to simultaneously be lifted vertically and fractured laterally as part of a cultivator or similar tilling equipment while still leaving almost all of the residue on the surface of the soil.

2. Description of Related Art

There are different forms of equipment for use in breaking up soil for cultivation. One may use a plow, a disc harrow, a field cultivator or other suitable field working implements. The present day practice is to utilize a conservation tillage strategy. One such implement is disclosed in US Patent Application Publication US 20060048953 A1 to Rozendaal et al which discloses a plurality of spaced apart coulter wheel assemblies for tilling the soil and providing a conservation tillage implement.

In some applications when the soil is compacted, coulter wheels cause minimal cultivation of the soil. The wheels do not cut into the soil, typically 3 to 4 inches. The user must either plow the ground, harrow the ground or use another tilling method or make multiple passes with the coulter wheel apparatus to achieve acceptable cultivation. Alternative methods may not result in a desired conservation tillage result.

A disc harrow is disclosed in U.S. Pat. No. 6,695,069 B2 which has a plurality of earth working discs. The discs rotate about a disc gang shaft to penetrate the soil to turn and mix the soil as the disc harrow is towed behind a tractor. A plurality of substantially parallel discs mounted to the shaft at uniformly spaced apart intervals along its length is referred to as a disc gang. Each disc gang is attached to the frame by means of mounts downwardly depending on the frame at suitable intervals along the length of the shaft.

Each gang is generally attached at an angle to the direction of travel of the tractor. Due to the concavity of the discs, the soil is turned and mixed as the implement is pulled through the field to achieve tillage of the soil.

SUMMARY OF THE INVENTION

The present invention relates to an improvement to a tilling implement which results in increased fracturing of the soil, upwardly, outwardly and laterally to successfully achieve cultivation of the soil. In particular, the present invention relates to a conservation tillage implement which has a plurality of individual coulter wheel assemblies although the present invention may be used with different varieties of discs. It has been discovered that one may pre-fracture the soil before the soil is tilled by the disc or coulter wheels which form cultivation tillage implements by disposing a plurality of S-tines on the front of a tilling implement which may be rotated upwardly and downwardly to pre-fracture the soil laterally and well as upwardly and outwardly from the foot of the S-tine to effectively precondition the soil for further tillage by, for example, coulter wheel assemblies as the tilling implement is used.

A plurality of S-tines is positioned to impact the soil before the coulter wheels impact the soil. This causes the soil to be disrupted and laterally displaced before the coulter wheels cuts the soil resulting in superior cultivation of soil. In some cases, the soil may be so hardened that a coulter wheel does not cultivate the soil. By impacting the soil with an S-tine first in time, the soil is then fractured horizontally, upwardly and outwardly and the coulter wheels more easily cultivate the soil by interaction of the coulter wheels with the pre-fractured soil resulting in an unprecedented tilling implement.

According to the present invention, there is provided a kit for facilitating a conservation tillage implement which causes the soil to be fractured and to then interact with the fluted coulter wheels to agitate the soil and to cause enhanced cultivation of the soil. By the use of the present invention, the soil may be fractured up to 4 inches deep and laterally up to 7 inches or more at a point between spaced apart fluted coulter wheels. Advantageously, a conservation tillage implement according to the present invention may be drawn at faster speeds than other conservation tillage implements or conventional tillage implements. While some tillage equipment is capable of speeds from 8 to 18 miles per hour, a more typical speed should be 5 to 7 miles per hour. The present invention permits the user to drive 8 to 10 miles per hour rather an expected speed of 5 to 7 miles per hour.

According to the present invention, there is provided a system for mounting adjustable S-tines on an existing tillage apparatus which has a frame that supports a plurality of spaced apart rows of laterally spaced apart individual fluted coulter wheel assemblies. The particular arrangement of the coulter wheels is a matter of design choice. It should be appreciated that a typical cultivator has a frame having multiple rows of frames which are disposed horizontally to the direction of movement of the cultivator frame. Disc or coulters or other means of tillage are selectively attached to the frame of the cultivator. The present invention is attached to a front coulter bar of a typical tillage apparatus and not at the rear of the cultivator and disposed on a fracture bar that is mounted on the front coulter bar. The user may selectively cause the fracture bar to be rotated such that an S-tine mounted thereon may be selectively positioned up or down to achieve the desired fracturing of the soil.

Use of S-tines for scratching or smoothing the soil after cultivation is such that the results achieved are incomparable to the synergetic effect of pre-fracturing and then the interaction of the pre-fractured soil with a fluted coulter, for example, that effects a surprising effect on the cultivation of the soil.

LIST OF REFERENCE NUMERALS UTILIZED IN THE DRAWINGS

20 Conventional cultivator frame 20
22 Coulter wheels
24 Center portion of tilling implement
26 left portion of tilling equipment
28 right portion of tilling equipment
30 left hydraulic wing folding cylinder
32 right hydraulic wing folding cylinder
34 left hinge
36 right hinge
38 S-tines
40 tires
42 coulter wheel assemblies
44 horizontal coulter bar
46 cross horizontal coulter bar
48 penetrator bar
50 Mounting bracket
52 U bolts
54 Upper end of mounting bracket 50
56 lower end of mounting bracket 50

58 bushing
60 axis of penetrator bar 48
62 hydraulic cylinder
63 U-shaped end of hydraulic cylinder
64 hydraulic cylinder bracket
66 aperture for securing hydraulic cylinder to bracket
68 mounting holes for receiving U-bolts
70 cylindrical rod
72 cotter pin
74 hydraulic cylinder rod
76 eyelets through U-shaped end of hydraulic cylinder
78 distal end of hydraulic cylinder 62
80 fracture bar cylinder mounting bracket
82 aperture for mounting distal end of hydraulic cylinder 62
84 spacer on fracture bar cylinder bracket at aperture 82
86 U-shaped bolts for fracture bar cylinder mounting bracket
88 foot on end of S-tine 38
90 bolt for attaching foot to S-tine
92 S-tine mounting bracket
94 planar portion of S-tine
96 bolt for mounting S-tine mounting bracket
98 nut for mating with bolt 96
100 bolt hole on S-tine mounting bracket
102 aperture in mounting bracket 92
104 claws on mounting bracket 92
106 alternative embodiment of hydraulic cylinder mounting bracket
108 center mounting bracket for hydraulic cylinder
110 secondary mounting bracket for use with 108
114 pressure valve connector to hydraulic cylinder 62
116 wing frame extra support bracket
118 ends of wing frame extra support bracket
120 stabilization tab on fracture bar cylinder mounting bracket 80

BRIEF DESCRIPTION OF THE DRAWINGS

The accompanying drawings illustrate the present invention. In the drawings, like elements are depicted by like reference numerals. The drawings are briefly described as follows:

FIG. 1 discloses a front view of a conservation tillage implement with the present invention mounted thereon.

FIG. 2 is a partial top view of a portion of FIG. 1 showing the mounting bracket and stabilizing bar mounted to the prior art structure of a tilling implement.

FIG. 3 is a partial front view of a tilling implement disclosing the fracture bar and S-tines of the present invention mounted to a first coulter bar of a conventional tilling implement.

FIG. 8 discloses a side view of a different mounting bracket and the hydraulic cylinder 62 and the fracture bar assembly for selectively rotating the fracture bar to position the S-tines attached to the fracture bar.

FIG. 9 is a partial sectional view of FIG. 8 showing the mounting bracket and hydraulic cylinder assembly.

DETAILED DESCRIPTION OF PREFERRED EMBODIMENT

Figure 4:
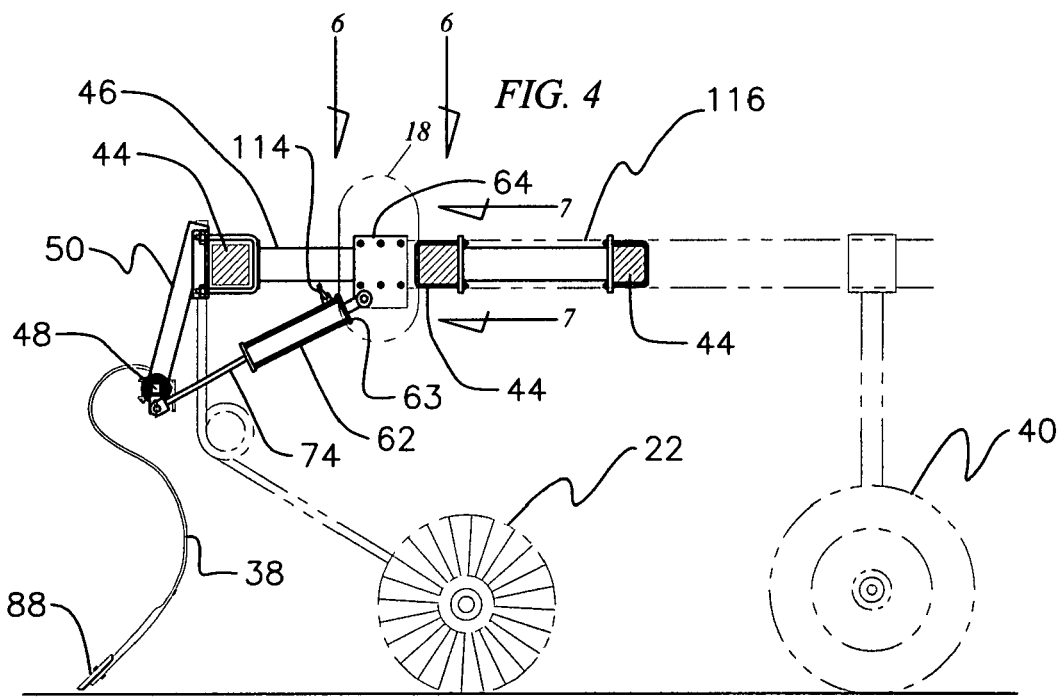
FIG. 4 is a side view of the present invention as it is mounted onto a conventional tilling implement when the S-tine is in a downwardly position.

Reference is now made to the FIGs. discussed herein below wherein like numerals are used to refer to like features of the invention.

Referring to FIG. 1, there is disclosed a convention cultivation frame 20 with a plurality of coulter assemblies 22. The frame and coulter wheels are disclosed in dashed lines. The particular components of the present invention are disclosed in bolded fashion. It may be appreciated that in large farming operations, the cultivation equipment is quite large to enable the user to cover many acres of ground in a shorter time. The conventional cultivator frame 20 disclosed in FIG. 1 may be seen to have a center portion 24, a left wing portion 26 and a right wing portion 28. Hydraulic apparatus 30 may be activated to cause left portion 26 of the tillage equipment 20 to be winged up to a nearly vertical position at left hinge 34. Likewise, hydraulic apparatus 32 may be activated to cause right portion 28 of tillage implement to rotate about right hinge 36.

The apparatus comprising the present invention is comprised of three (3) sections for support of S-tines 38. While multiple S-tines are disclosed, select ones have been identified by reference numeral 38, it being understood that the reader can readily appreciate that there is a S-tine disposed between coulter blades 22. Only select coulter blades have been identified, it being understood that the reader can see that coulter blades 22 span the entire width and length of the tilling implement and has multiple rows front to back.

When the tillage implement is of substantial width that the sides thereof are winged for ease of transportation, there would be provided a pre-fracturing apparatus for each wing 26 and 28 as well as center portion 24 of tilling implement 20. One may appreciate that when the tillage equipment 20 is being moved without tilling, then tires 40 would support the tilling implement 20 as in FIG. 1, while the tires 40 may be raised to thus cause the weight of tilling equipment 20 to be supported by coulter wheels 22.

A conventional tilling implement may have coulter wheels 22 spaced apart by 21 inches. Coulter wheels 22 may be spaced closer together, for example, 7 inches apart, should the operator of the equipment so determine as coulter wheel assemblies 42 are individually mounted on the horizontal coulter bars 44. There are multiple horizontal rows of coulter bars 44 from left to right from the front of the tillage implement to its rear which are connected by cross bars 46 which extend from the front of the tilling implement toward the rear of the filling implement (See FIG. 4 and FIG. 5) in a matrix configuration.

Referring to FIG. 3, a penetrator bar 48 is positioned in parallel alignment with coulter bars 44. Mounting brackets 50 (FIG. 13 thru FIG. 16) are fixedly mounted to the first coulter bar 44. Penetrator bar 48 is positioned through mounting bracket 50 so that the penetrator bar or fracture bar may be rotated about an axis that is parallel with first coulter row 44.

Referring now to FIG. 13, FIG. 14, FIG. 15 and FIG. 16, it may be appreciated that mounting bracket 50 is securely and selectively mounted to first coulter bar 44. U-bolts 52 (FIG. 4 and FIG. 5) are preferably used to cause the upper end 54 of mounting bracket 50 to be mounted to horizontal coulter bar 44 such that lower end 56 of mounting bracket 50 extends downwardly toward the ground. Mounting bracket 50 supports fracture bar 48, also referred to as penetrator bar, which is rotatably secured to end 56 of mounting bracket 50 by way of bushing 58.

Figure 16:
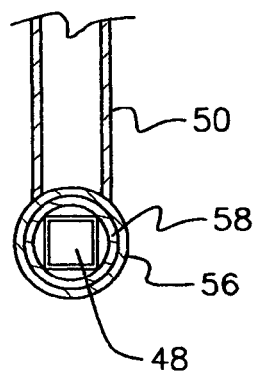
FIG. 16 is an exploded view of the extended end of the mounting bracket of FIG. 13 showing the fracture bar and rotating bushing for engagement with the extended end of the mounting bracket.

Referring to FIG. 16, lower end 56 of mounting bracket 50 is circular dimensioned at lower end 56 to receive there through a bushing 58. The interface between bushing 58 and circular lower end 56 may be lubricated to make the two components to slideably interface with each other. Bushing 58 has forcefully passed there through penetrator bar 48. The exact dimensioning of penetrator bar 48, which is square, is such that penetrator bar 48 will pass through circular bushing 58 but not rotate within bushing 58. Bushing 58 forms a collar about penetrator bar 48 which slideably mates with end 56 of mounting bracket 50.

Figure 13:
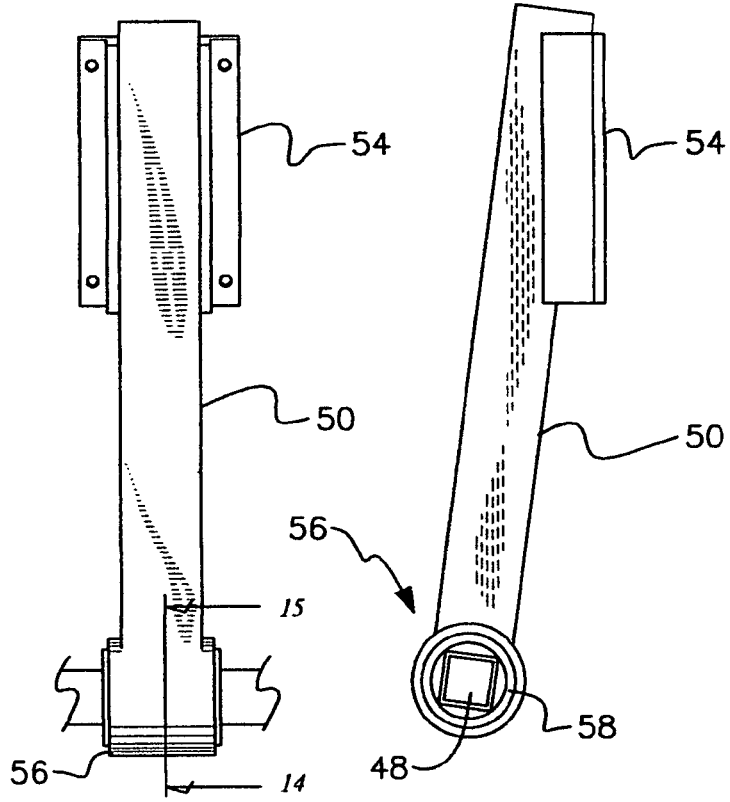
FIG. 13 is a front view of a support bracket as disclosed in FIG. 1 which mounts to the coulter frame for support of a fracture bar.
Figure 14:
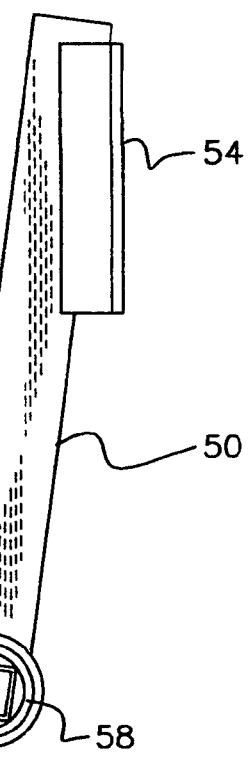
FIG. 14 is a right side view of FIG. 13 in partial cross-section where the mounting bracket engage the fracture bar which rotates there within.
Figure 15:
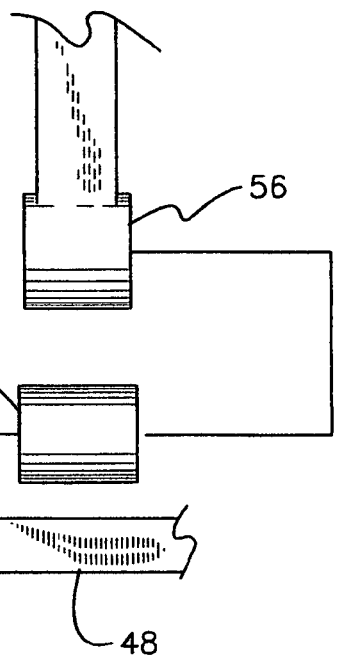
FIG. 15 is a smaller detail of the mounting bracket of FIG. 13 disclosing the bushings and fracture bar rotating assembly.

With specific reference to FIG. 15, which is a cross sectional view of FIG. 13 at lower end 56 of mounting bracket 50, one may understand that penetrator bar is positioned inside bushing 58. Circular bushing 58 is rotatably positioned inside circular end 56 of mounting bracket 50. This particular configuration enables penetrator bar 48 to be rotated about axis 60 of penetrator bar 48, bushing 58 and lower end of mounting bracket 56 which axis is substantially parallel with the longitudinal axis of first horizontal coulter bar 44.

Figure 5:
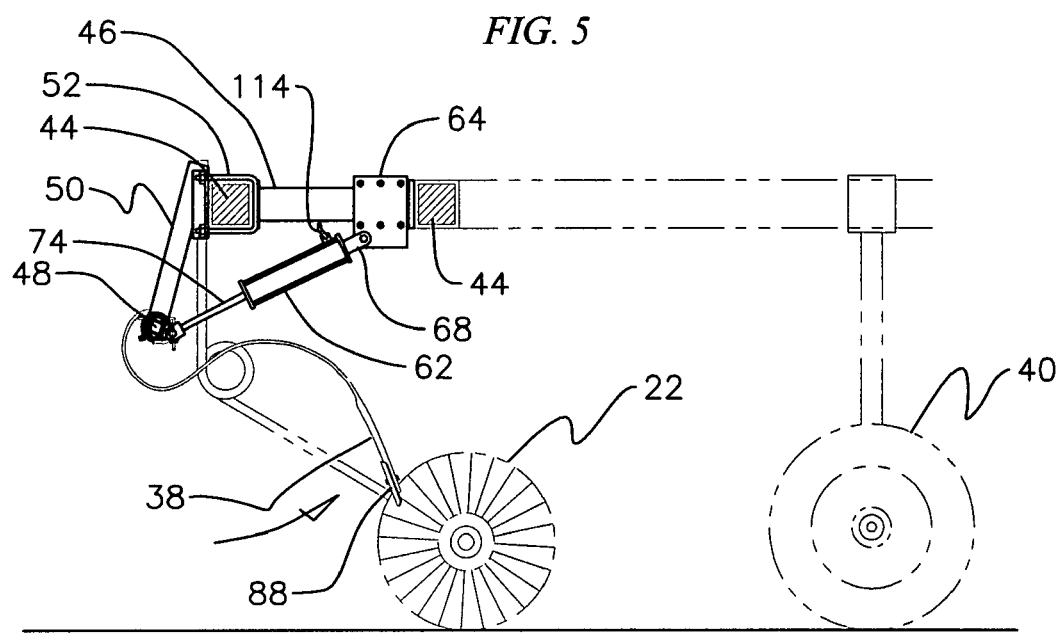
FIG. 5 is a side view of the present invention as it is mounted onto a conventional tilling implement when the S-tine is in an upwardly position.

Referring to FIGS. 4 and 5, a hydraulic cylinder 62 is positioned between the structure of a conventional tilling implement and penetrator bar 48 whereby hydraulic pressure from the tractor pulling the tilling implement may be used to cause the hydraulic cylinder to rotate the penetrator bar 48 such that an S-time mounted 38 on penetrator bar 48 may be positioned as determined by the operator of the tilling equipment to determine such penetration of the S-tine into the soil as desired.

Typical structure of a tilling implement will have multiple horizontal rows which are positioned parallel to each other from the front of the tilling equipment to the rear of the tilling implement. Structural integrity is achieved by having multiple rows of structural members which span between the horizontal rows and perpendicular thereto in a direction from the front of the tilling equipment to the rear of the tilling equipment in a checker board configuration. The horizontal rows which span from left to right when the implement is viewed from its front (FIG. 1) may be referred to as coulter rows. The coulter assemblies are positioned on the various coulter rows, independently, at such spacing as the design choice may dictate. The other rows which run from the front of the tilling implement toward its rear stabilize the structure.

Figure 6:
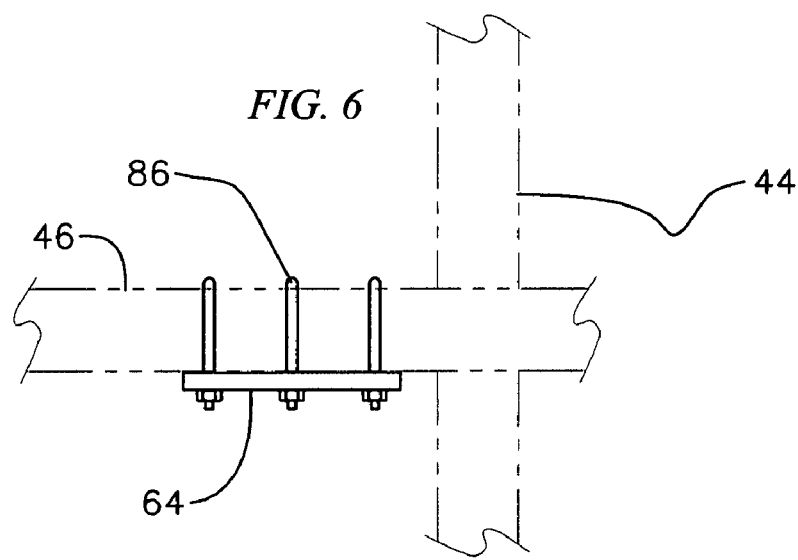
FIG. 6 is a top partial top view of the present invention showing the mounting bracket that is attached to the frame of an existing tilling implement for mating a hydraulic cylinder 62 for controlled adjustment of the fracture bar and thus the S-tines.
Figure 18:
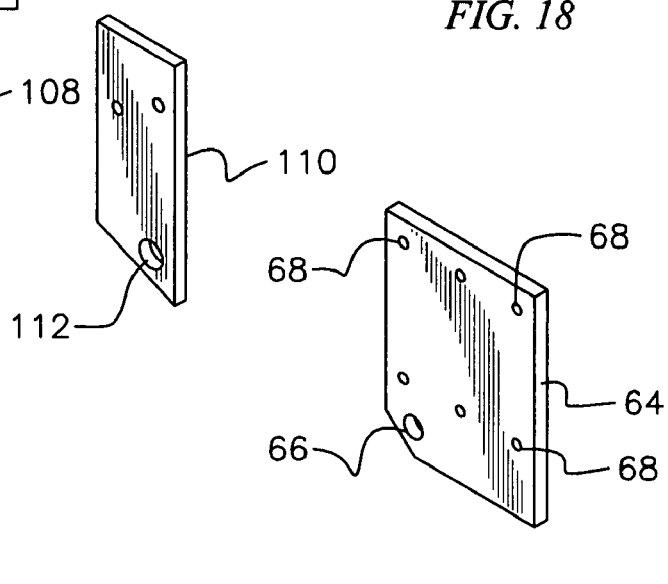
FIG. 18 is a mounting bracket as also shown in FIG. 6 for mating a hydraulic cylinder with the main frame of a conventional tilling implement.

To one of the rows which run from the front of the tilling equipment toward its rear is mounted hydraulic cylinder bracket 64, see, FIGS. 4, 5, 7 and 18. FIG. 18 is a side prospective view of the bracket used in FIG. 4 and FIG. 5 and also disclosed in FIG. 6.

Figure 7:
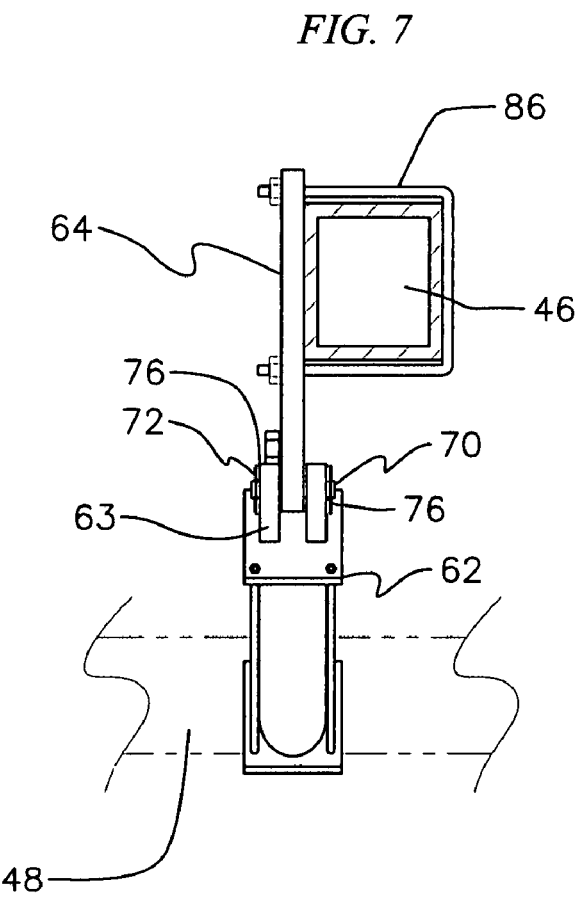
FIG. 7 is a right end view of the mounting bracket disclosed in FIG. 5 with the bracket mounted to a part of the frame of a conventional tiling implement.

FIG. 7 is a rear view of mounting bracket 64 as mounted to cross horizontal coulter bar 46 which runs from the front to the rear of the tilling implement. Hydraulic cylinder 62 is secured to mounting bracket 64 by end 63 of hydraulic cylinder 62. End 63 of hydraulic cylinder 62 is an U-shaped formation having eyelets 76 which permits a cylindrical rod 70 to pass through eyelets 76 of U-shaped formation 63 of hydraulic cylinder 62 and through aperture 66 (FIG. 18 of mounting bracket 64 and be secured thereto by cotter pins 72.

Figure 10:
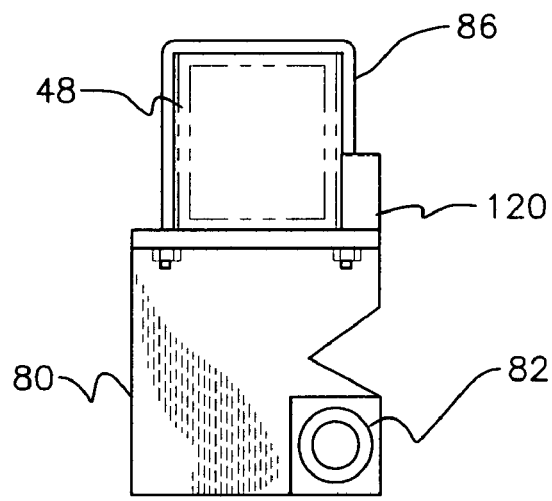
FIG. 10 a side view of the mounting bracket which mounts on the fracture bar for rotating engagement with the hydraulic cylinder for selective adjustment of the S-tines.
Figure 11:
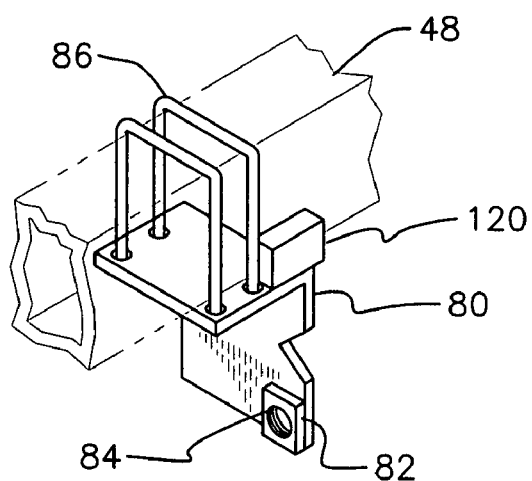
FIG. 11 is a perspective view of the mounting bracket of FIG. 10 as it would mount to the fracturing bar.
Figure 12:
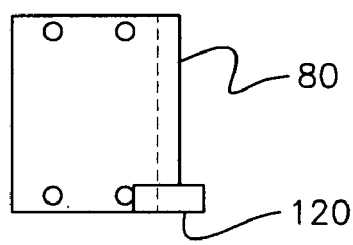
FIG. 12 is a top view of the mounting bracket of FIG. 10 without the mounting U-bolts used to affix the mounting bracket to the frame of an existing tilling implement.

Referring to FIG. 8, distal end 78 of end of the hydraulic cylinder 74 has an U-shaped end substantially the same as U-shaped end of hydraulic cylinder 63. Distal end 78 of the hydraulic cylinder 62 mates with fracture bar cylinder mounting bracket 80. Referring now to FIGS. 10, 11 and 12, fracture bar cylinder mounting bracket 80 is disclosed in detail. FIG. 11 discloses a perspective view of the fracture bar cylinder mounting bracket with the fracture bar 48 show is dashed lines. The fracture bar is also referred to as the penetrator bar. Fracture bar cylinder mounting bracket 80 has an inverted L shape.

Distal end 78 (FIG. 8) of hydraulic cylinder 62 attaches to fracture bar cylinder mounting bracket 80 at aperture 82 (FIG. 10). A spacer 84 is affixed at aperture 82 to adjust the width of the mounting bracket to conform with the U-shaped distal end 78 of hydraulic cylinder 62 (FIG. 8). As can be seen in side view (FIG. 10) of the fracture bar cylinder mounting bracket 80, the U-shaped bolts 86 securely mate with penetrator (fracture) bar 48. In a preferred embodiment one hydraulic cylinder 62 is used for each section of penetrator bar 48. The purpose of the hydraulic cylinder 62 is to permit the user of the equipment to selectively cause the hydraulic cylinder 62 to rotate penetrator bar 48 (FIG. 1).

FIGS. 4 and 5 disclose penetrator bar 48 having S-tines 38 mounted thereon. As penetrator bar is rotated by the interaction of hydraulic cylinder 62 with fracture bar cylinder mounting bracket 80, the position of the S-tines is determined. S-tine 38 may be rotated as in FIG. 5 or down in FIG. 4. In the preferred embodiment, S-tine 38 is positioned in the down position as shown in FIG. 4 such that end 88 of S-tine 38 will engage or fracture the soil as the tilling equipment is pulled through a field by a tractor or similar motorized apparatus.

An S-tine 38 is selectively positioned between the rows of coulter blades 22. Actually, the coulter blades in the first row may not be longitudinally aligned with the blades of the next succeeding row of coulter blades. The coulter blades may be angled such that the blades engage the soil at an angle other than parallel with the movement of the tillage implement. Nevertheless, an S-tine 38 is mounted on penetrator bar 48 such that S-tine 38 will fracture the soil at a point which is desirably midway between the coulter wheels 22 mounted on the tilling implement.

As S-tine 38 engages the soil, the soil is fractured by end 88 of S-tine 38. End 88 may be two inches in width and five inches in length in a preferred embodiment. End 88 will fracture the soil laterally, upwardly and outwardly and cause the soil to be thrown outwardly from S-tine 38. S-tine 38 may penetrate 3 to 4 inches into the soil. As the soil is fractured by the narrow S-tine 38, the soil is pre-fractured before actually being engaged by the coulter wheels 22 of the tilling implement 20. As S-tine 38 disrupts the soil and causes the soil to be propelled upwardly, the soil then interacts with coulter wheels 22 to churn the soil. This provides a different result than if the soil had merely been cut by coulter wheels 22. By prefracturing the soil by use of the S-tine 38, even the soil that is hard and difficult to cultivate by conventional tilling implements is then tillable by a single process rather than having to cultivate the soil with more than one pass or with different tilling equipment such as a harrow and/or a disc and a coulter wheel.

Figure 20:
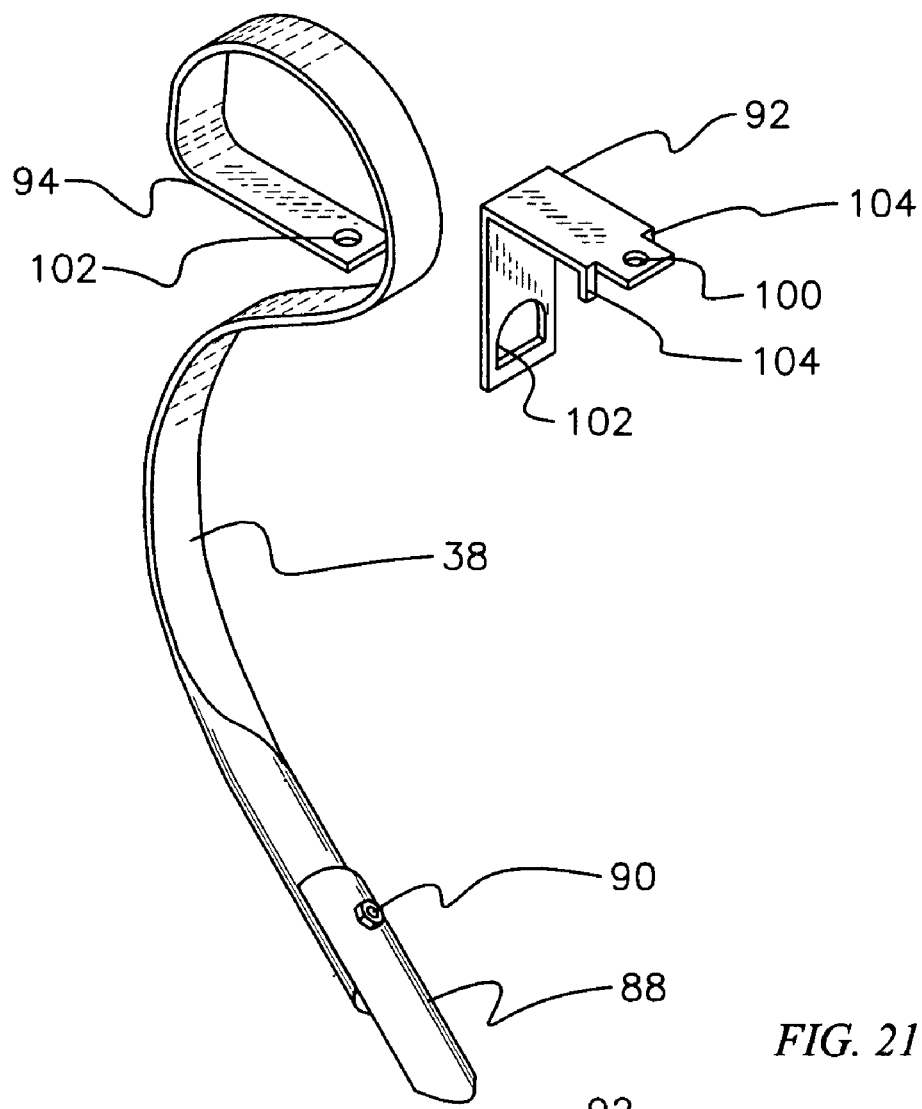
FIG. 20 is a perspective view of a S-tine and mounting bracket for securing the S-tine to the penetrator bar.
Figure 21:
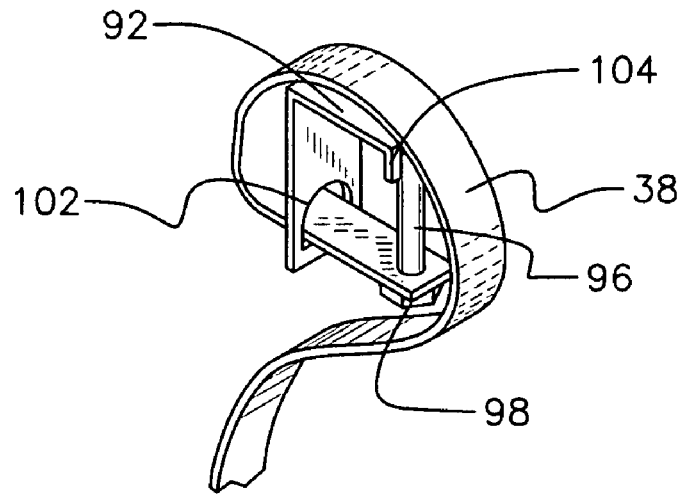
FIG. 21 is a perspective view of the S-tine as it is mated with the mounting bar for securing the composite configuration to the penetrator bar.

FIG. 20 and FIG. 21 disclose an S-tine 38 having a foot 88. Foot 88 is detachably connected to S-tine 38 by a bolt 90. Depending on the particular soil to be pre-fractured, one may choose a different foot having a different configuration such as a shovel or a spade. S-Tine 38 is attached to penetrator bar 48 (See FIGS. 4 and 5) by the use of S-tine mounting bracket 92. FIG. 21 discloses that S-tine 38 having a planar portion 94 which is positioned juxtaposed a side of penetrator bar 48. Penetrator bar 48 is square in cross-section as can be seen in FIG. 10. S-tine 38 is mounted rigidly to penetrator bar 48 through the use of S-tine mounting bracket 92. S-tine mounting bracket 92 is fitted around penetrator bar 48 and mated thereto by the clamping force by a bolt 96 and nut 98 to screwing thereon. Bolt 96 passes through bolt hole 100 in bracket 92 and bolt hole 102 in S-tine 38 on planar portion 94. S-tine 38 is stabilized to the penetrator bar 48 by S-tine mounting bracket 92 and planar portion 94 of S-tine 38. Mounting Bracket 92 further comprises an aperture 102 through which S-tine 38 passes. Note that mounting bracket 92 has claws 104 which embrace penetrator bar 48 to cause S-tine 38 to be fixedly adhered to penetrator bar 48. S-tine 38 can flex should end 88 come in contact with rocks or other hard surfaces to avoid breaking the structure of the S-tine.

Figure 17:
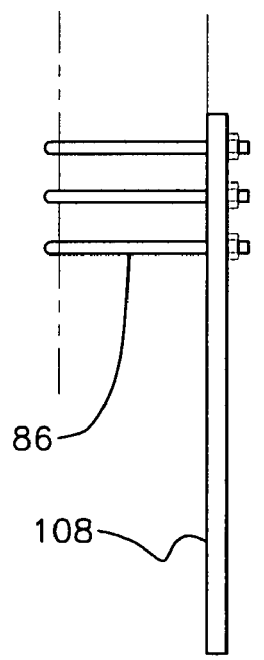
FIG. 17 discloses a different embodiment of a mounting assembly for mating a hydraulic cylinder and the main frame of a conventional tilling implement.

FIG. 17 discloses an alternative embodiment of a hydraulic cylinder mounting bracket 106. In some applications, it may be difficult to use mounting bracket 64 due to the geometric of the structure where one needs to place a hydraulic cylinder. Main mounting bracket part 108 mounts to a structural member of the tilling implement that runs from the front to the rear of the implement. FIG. 17 shows a partial side view of the main mounting bracket 108 and the U-bolts which secure this main mounting bracket 108 to the main frame of the cultivator implement. Secondary mounting bracket 110 mates with main mounting bracket 108 and has at its then lower extremity aperture 112 for securing hydraulic cylinder 62 to bracket 110 which is similar to aperture 66 in mounting bracket 64 (FIG. 18).

FIG. 8 discloses the mounting bracket shown in FIG. 17 as it functions between the frame of an existing tilling implement to the hydraulic cylinder which is connected to fracture bar mounting bracket 80 which is mounted to penetrator bar 48 to effect rotation of penetrator bar 48. Hydraulic cylinder 62 has a pressure valve connector 116 to which the hydraulic system of a tractor or similar mechanism for causing the tilling equipment to move is connected for control thereof. In general application one hydraulic cylinder 62 is used for each section of the penetrator bar 48.

It may also be appreciated that the fracture bar cylinder mounting bracket 80 has a unique feature in the nature of a stabilization tab 120 on fracture bar cylinder mounting bracket 80 which is positioned against a side of penetrator bar 48 when bracket 80 is mounted onto the penetration bar by the use of U-bolts 86. This particular configuration provides added stability to the fracture bar cylinder mounting bracket to prevent its lateral rotation when pressure is applied to bracket 80 by hydraulic cylinder 62 to cause rotation of penetrator bar 48 and to stabilize the penetrator bar 48 when the penetrator bar 48 is being used to further support S-tines 38 and the S-tines 38 pre-fracture soil and move vertically in response to rocks or other obstacles which make the penetration of foot 88 three to four inches or more into the soil.

Figure 19:
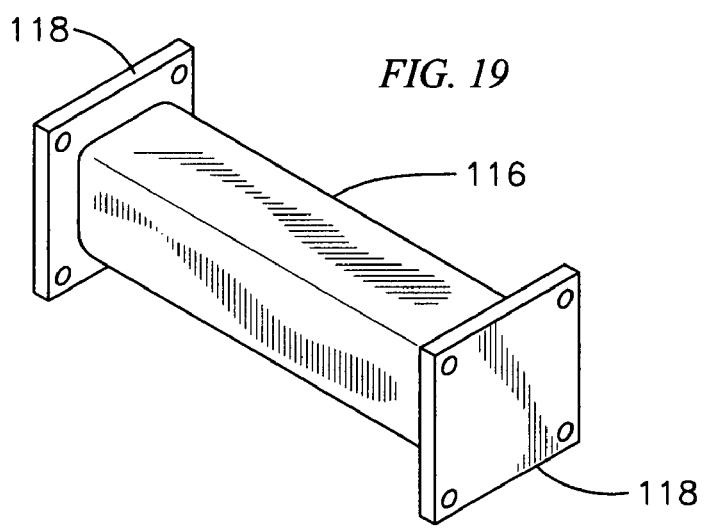
FIG. 19 is a spacer bar from positioning between a first and second coulter bar for increased integrity of the matrix mainframe of a conventional tilling implement.

In some applications, it is desirable to strengthen the wing frames 26 and 28. A wing frame extra support bracket 116 (FIG. 19) may be mounted between the first coulter row and the second coulter row to add strength and rigidify to the structure. Wing frame extra support bracket 116 has a mounting bracket 118 which frame is dimensioned to mount between the first coulter row and the second coulter row of a tilling implement. U-bolts 86 as disclosed in FIG. 11 are utilized to secure the ends 118 of the wing frame extra support bracket 116. FIG. 2 shows wing frame extra support bracket 116 as it is mounted between a horizontal coulter bar 44 and a second horizontal coulter bar 44 to stabilization of wing section 26. Wing section 28 may be likewise reinforced.

It is believed that with the above description and illustration, the various features of the present invention will be apparent. Variations and modification are possible without departing from the spirit of the invention. It will, of course, be understood that various changes may be made in the form, details, arrangement and scope of the invention which consists of the matter shown and described herein and set forth in the appended claims.

I claim:

1. A tillage implement for tilling soil comprising:
    (a) a cultivator frame having a right side, a left side, a front side and a back side;
    (b) a plurality of horizontal longitudinally spaced apart coulter bars selectively spaced between said left side of said cultivator frame and said right side of said cultivator frame;
    (c) a plurality of cross horizontal coulter bars selectively spaced between said plurality of horizontal longitudinally spaced apart coulter bars and being spaced from said front side of said cultivator frame toward said back side of said cultivator frame;
    (d) a plurality of individual spaced apart coulter wheels selectively mounted on said horizontal longitudinally spaced apart coulter bars; and
    (e) means for pre-fracturing the soil mounted at the front of said cultivator frame in front of the foremost cross horizontal coulter bar comprising:
        (a) a plurality of mounting brackets having a first end affixed to a first horizontal coulter bar at the front side of said cultivator frame and a second end rigidly disposed downwardly from said horizontal coulter bar toward the soil;
        (b) a penetrator bar;
        (c) means for rotatably mating said penetrator bar with said second end of said mounting brackets;

(d) a least one hydraulic cylinder;
(e) a plurality of S-tines; and
(f) means for mounting said S-tines to said penetrator bar;
wherein said S-tines are positioned to pre-fracture the soil at positions midway between said plurality of individual spaced-apart coulter wheels, and
wherein, said plurality of S-tines are fixedly secured to said penetrator bar and wherein said hydraulic cylinder is affixed to said penetrator bar to effect selected rotation of said penetrator bar to thereby position said S-tines secured on said penetrator bar for engagement with the soil, said plurality of S-tines having a first end affixed to said penetrator bar and a second end extending downwardly to pre-fracture the soil, said second end having a detachable foot,
whereby the soil is disrupted upwardly and outwardly and laterally by said foot of said S-tines such that the soil is dispersed upwardly and outwardly and impacts said coulter wheels to achieve improved cultivation of the soil.

2. A tillage implement for tilling soil as set forth in claim 1 wherein said means for rotatably mating said penetrator bar with said second end of said mounting brackets comprises:
a. a circular channel extending through said second end of said mounting bracket;
b. a circular bushing for mating engagement about said penetrator bar and for mating engagement into said circular channel extending through said second end of said mounting bracket,
whereby said penetrator bar is fixedly disposed within said mounting bracket and rotatable there within.

3. A tillage implement for tilling soil as set forth in claim 1 to further comprises:
a. a means for mounting said hydraulic cylinder to a said cross horizontal, coulter bar; and
b. a means for mounting said hydraulic cylinder to said penetrator bar;
wherein said hydraulic, cylinder comprises a first end and a second end,
whereby said first end of said hydraulic cylinder is mounted to a said cross horizontal coulter bar by said means for mounting said hydraulic cylinder to a said cross horizontal coulter bar and said whereby second end is mounted to said penetrator bar by said means for mounting said hydraulic cylinder so said penetrator bar,
whereby the angular position of said penetrator bar may be determined by use of said hydraulic cylinder to thereby selectively position said S-tines into the soil to achieve improved cultivation of the soil when tilling the soil.

4. A tillage implement for tilling soil as set forth in claim 3 wherein said means for mounting said hydraulic cylinder to said penetrator bar comprises:
an inverted L-shaped penetrator bar mounting bracket having its upper portion affixed to said penetrator bar and a lower portion for mating engagement with said hydraulic cylinder;
U-bolts for mounting said upper portion of said L-shaped penetrator bar bracket to said penetrator bar; and
a stabilization tab on said upper portion of said L-shaped penetrator bar mounting bracket for engagement with said penetrator bar to stabilize the L-shaped penetrator bar mounting bracket in relationship to said penetrator bar.

5. A tillage implement for tilling soil as set forth in claim 1 wherein said penetrator bar is square in cross-section and has a first side, a second side, a third side and a fourth side, and wherein said S-tine comprises a serpentine configuration having a first end having a planar, section for planar engagement with said penetrator bar and having a bolt hole aperture at the end of said planar section and a second end having a substantially straight portion having a foot thereon, to further comprise a means for mounting said S-tine to said penetrator bar,
said means for mounting said S-tine to said penetrator bar comprising an L-shaped bracket having a first flange and a second flange, said first flange having an aperture there through and said second flange having a bolt hole aperture there through and claws depending therefrom,
said first flange being positioned on a first side of said penetrator bar;
said second flange being positioned on a second side of said penetrator bar with said depending claws engaging said third side of said penetrator bar,
wherein, said planar portion of said S-tine is positioned above said mounting means with said planar portion of said S-tine passing through said aperture of said first flange and said third side of said penetrator bar, and further, wherein said second flange of said L-shaped bracket comprises an aperture and
wherein said mounting means further comprises a bolt for mating, securing engagement of said second flange of said mounting bracket to said aperture of said planar section of said S-tine to thereby secure there between said penetrator bar.

6. A tillage implement for tilling soil comprising:
(a) a cultivator frame having a right side, a left side, a front side and a back side;
(b) a plurality of horizontal longitudinally spaced apart coulter bars selectively spaced between said left side of said cultivator frame and said right side of said cultivator frame;
(c) a plurality of cross horizontal coulter bars selectively spaced between said plurality of horizontal longitudinally spaced apart coulter bars and being spaced from said front side of said cultivator frame toward said back side of said cultivator frame;
(d) a plurality of individual spaced apart coulter wheels selectively mounted on said horizontal longitudinally spaced apart coulter bars;
(e) means for pre-fracturing the soil comprising a plurality of rotatably mounted S-tines spaced midway between said spaced apart coulter wheels; and
wherein said means for pre-fracturing the soil is mounted on from said front side of said cultivator frame before said plurality of horizontal longitudinally spaced apart coulter bars and pre-fractures the soil for interactive tilling engagement with said coulter wheels during use of said tilling implement.

7. A tillage implement for tilting soil as set forth in claim 3 wherein said means for mounting said hydraulic cylinder to a said cross horizontal coulter bar comprises a substantially square planar flange having a plurality of mounting holes there through and a plurality of U-bolts for securing said square flange to said cross horizontal coulter bar, said U-bolts encasing said cross horizontal coulter bar and mating with said square flange through said plurality of mounting holes and wherein said substantially square flange has an aperture there through for mating with said first end of said hydraulic cylinder.

8. A tillage implement for tilling soil as set forth in claim 3 wherein said means for mounting said hydraulic cylinder to a said cross horizontal coulter bar comprises a planar flange having a first end having a plurality of engagement holes there through for mating with a plurality of U-bolts, said U-bolts encasing said cross horizontal coulter bar to mate said flange to said cross horizontal coulter bar, said flange further comprising a longitudinal flange portion extending away from said horizontal coulter bar and downwardly toward the soil, said longitudinal flange portion having an aperture therein for mating said first end of said hydraulic cylinder thereto.

* * * * *